United States Patent
Lindström et al.

(10) Patent No.: US 7,907,541 B2
(45) Date of Patent: Mar. 15, 2011

(54) METHOD AND ARRANGEMENT FOR ESTABLISHING A COMMUNICATION SESSION FOR MULTIMEDIA

(75) Inventors: Mattias Lindström, Stockholm (SE); Per Synnergren, Luleå (SE); Tony Larsson, Upplands Väsby (SE); Mona Matti, Nacka (SE); Niklas Björk, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 309 days.

(21) Appl. No.: 12/064,210

(22) PCT Filed: Nov. 1, 2005

(86) PCT No.: PCT/SE2005/001637
§ 371 (c)(1),
(2), (4) Date: Jan. 16, 2009

(87) PCT Pub. No.: WO2007/024169
PCT Pub. Date: Mar. 1, 2007

(65) Prior Publication Data
US 2009/0168696 A1    Jul. 2, 2009

(30) Foreign Application Priority Data
Aug. 22, 2005 (SE) ........................... 0501866

(51) Int. Cl.
*H04L 12/56* (2006.01)

(52) U.S. Cl. ...................................................... 370/252
(58) Field of Classification Search .................. 370/252, 370/465
See application file for complete search history.

(56) References Cited

U.S. PATENT DOCUMENTS

| | | | |
|---|---|---|---|
| 6,847,610 B1 * | 1/2005 | Suumaki et al. | 370/230.1 |
| 2002/0002041 A1 * | 1/2002 | Lindgren et al. | 455/404 |
| 2002/0147824 A1 * | 10/2002 | Hurtta et al. | 709/230 |
| 2003/0120135 A1 * | 6/2003 | Gopinathan et al. | 600/300 |
| 2004/0151155 A1 * | 8/2004 | Jouppi | 370/349 |
| 2005/0100021 A1 * | 5/2005 | Suomi | 370/395.21 |
| 2005/0128963 A1 * | 6/2005 | Gazda et al. | 370/278 |
| 2006/0153124 A1 * | 7/2006 | Kant et al. | 370/328 |
| 2007/0081499 A1 * | 4/2007 | Johnsen | 370/335 |
| 2007/0201430 A1 * | 8/2007 | Holmstrom et al. | 370/352 |
| 2007/0223450 A1 * | 9/2007 | Holmstrom et al. | 370/352 |
| 2007/0258427 A1 * | 11/2007 | Shaheen et al. | 370/338 |

* cited by examiner

*Primary Examiner* — Melvin Marcelo (57) ABSTRACT

A method and arrangement for establishing a packet-switched multimedia session for a mobile terminal (A) in communication with another party (B), wherein a primary PDP (Packet Data Protocol) context has been activated in a mobile network for the mobile terminal. Information on the forthcoming session is received which has been negotiated and agreed between the communicating parties. It is then determined whether any network resources providing a required QoS are needed for the session, and whether a secondary PDP context is to be activated for the mobile terminal and the forthcoming session. If network resources are needed and a secondary PDP context is to be activated, the activation of said secondary PDP context is triggered.

22 Claims, 3 Drawing Sheets

METHOD AND ARRANGEMENT FOR ESTABLISHING A COMMUNICATION SESSION FOR MULTIMEDIA

TECHNICAL FIELD

The present invention relates generally to a method and arrangement for establishing a communication session for multimedia involving a mobile terminal.

BACKGROUND OF THE INVENTION AND PRIOR ART

With the emergence of 3G mobile telephony, new packet-based communication technologies have been developed to support multimedia communication. For example, GPRS (General Packet Radio Service) and WCDMA (Wideband Code Division Multiple Access) technologies support wireless multimedia telephony services involving packet-switched communication of data representing images, text, documents, animations, audio files, video files, etc., in addition to traditional circuit-switched voice calls.

Multimedia services typically entail transmission of encoded data representing text, documents, images, audio files and video files in different formats and combinations. The term "multimedia" will be used in this description as generally referring to any choice of media communicated by using the packet based IP (Internet Protocol) transport technology.

A network architecture called "IP Multimedia Subsystem" (IMS) has been developed by the 3$^{rd}$ Generation Partnership Project (3GPP) as an open standard for handling multimedia services and sessions in the packet domain. IMS is a platform for enabling services based on IP transport, more or less independent of the access technology used, and is neither restricted to any specific services. Thus, an IMS network controls multimedia sessions but is not used for the actual transfer of payload data which is routed over access networks and any intermediate transport networks.

Figure 1:
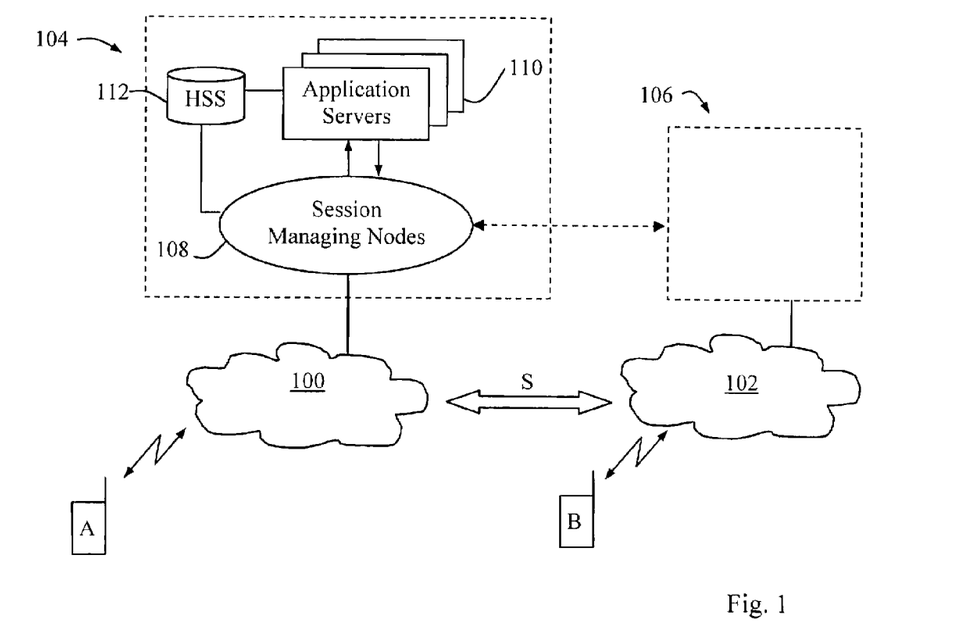
FIG. 1 is a schematic view of a conventional network structure for communicating multimedia between two mobile terminals.

FIG. 1 is a simplified schematic illustration of a basic network structure for providing multimedia services by means of an IMS service network. A first mobile terminal A is connected to a first radio access network 100 and communicates with a second mobile terminal B connected to a second radio access network 102, in a communication session S involving one or more multimedia services. There may also be an intermediate backbone network, not shown, as well linking the access networks 100 and 102.

An IMS network 104 is connected to the first radio access network 100 and handles the session with respect to terminal A. In this figure, a corresponding IMS network 106 handles the session on behalf of terminal B, and the two IMS networks 104 and 106 may be controlled by different operators. Alternatively, terminals A and B may of course be connected to the same access network and/or may belong to the same IMS network. Terminal A may also communicate with a fixed terminal or computer or server instead, e.g. for downloading some media over the Internet, as long as the other party is capable of SIP communication. Moreover, if a terminal is roaming in a visited access network, multimedia services are handled by the terminal's "home" IMS network.

The session S shown in FIG. 1 is managed by specific nodes in each IMS network, here generally referred to as "session managing nodes" 108. These nodes typically include S-CSCF (Serving Call Session Control Function), I-CSCF (Interrogating Call Session Control Function) and P-CSCF (Proxy Call Session Control Function). Each IMS network 104,106 also includes one or more application servers 110 for enabling various multimedia services. Further, a main database element HSS (Home Subscriber Server) 112 stores subscriber and authentication data as well as service information, among other things. IMS network 106 is basically similar to network 104. The various specific functions of the shown network elements 108-112 are generally known in the art, but are not necessary to describe here further to understand the context of the present invention. Of course, the IMS networks 104,106 contain numerous other nodes and functions not shown here for the sake of simplicity.

A specification for handling sessions in IMS networks has been defined called "SIP" (Session Initiation Protocol, according to the standard IETF RFC 3261). SIP is an application-layer control protocol for signalling, to create and generally handle sessions over a packet-switched logic. The SIP standard is thus used by IMS systems and SIP-enabled terminals to establish and control IF multimedia communications. SIP itself does not provide multimedia services, but rather makes available a set of primitives that other protocols or applications can use to actually implement such services.

For example, a message called "INVITE" is defined in SIP to initiate a multimedia session during session set-up, when a certain application has been invoked. The SIP INVITE message typically includes, among other things, a description of the session, i.e. information on required codec(s) and other communication parameters needed for the forthcoming session.

SIP uses an additional protocol called Session Description Protocol, SDP, for describing multimedia sessions, which can be embedded as a self-contained body within SIP messages. SDP can be used by terminals to exchange information regarding their specific capabilities and preferences, in order to negotiate and agree on which session parameters, codec's in particular, to use during a forthcoming multimedia session, as is well-known in the art. Preferred or required session parameters may be indicated as attributes referred to as "pre-conditions" in the SDP information.

Many mobile applications require a certain Quality of Service QoS in order to provide a satisfying result to end-users. For UMTS networks, four main traffic classes have been defined: "conversational class", "streaming class", "interactive class" and "background class", in order to classify different needs regarding bit rates and delays. These traffic classes are primarily distinguished by their requirements regarding transfer delays, such that applications of the conversational class tolerate only small delays, sometimes also referred to as "real-time", whereas the background class is applied to the least delay-sensitive applications, sometimes also referred to as "best effort".

The selection of a UMTS traffic class for an application is used for assigning a suitable physical channel in the access network, generally referred to as a RAB (Radio Access Bearer), in order to optimise the scarce radio recourses in the access network, whilst maintaining acceptable quality for the end-user.

Figure 2:
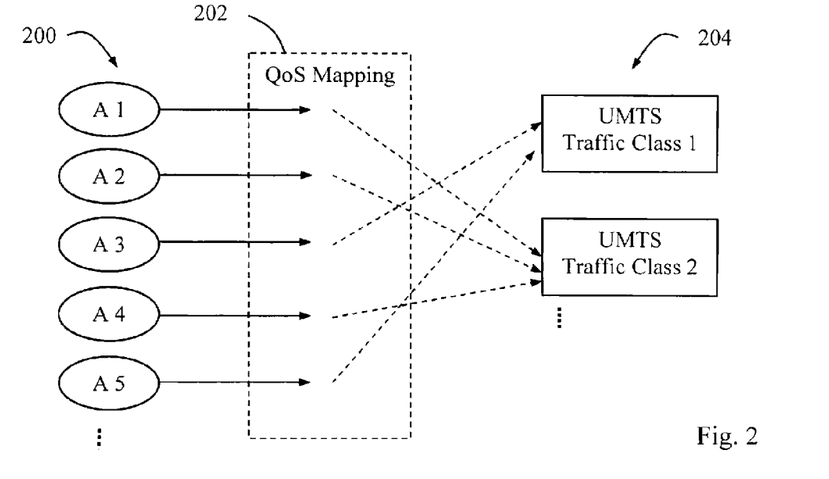
FIG. 2 is a schematic diagram illustrating the mapping of applications onto UMTS traffic classes in a mobile terminal.

Mobile terminals capable of multimedia are typically configured to identify for each inherent application, a UMTS traffic class, as schematically illustrated in FIG. 2. Thus, a mobile terminal may hold a number of applications 200, denoted as A1, A2, A3, A4, A5 . . . . A mapping function 202 in the terminal translates each application to a certain UMTS traffic class 204, of which only two are shown here. In this case, applications A1, A2 and A4 are mapped to the same UMTS traffic class 2, since they have similar requirements regarding bit rate and delay, whereas applications A3 and A5 are mapped to UMTS traffic class 1. In this way, several applications with similar characteristics may be mapped onto the same RAB, fulfilling their requirements.

However, before a mobile terminal can exchange any SIP messages with the IMS network, a "PDP (Packet Data Protocol) context" must be established for the terminal. Basically, a PDP context can be activated once the terminal has been powered on. Activating a PDP context for a mobile terminal includes allocating a temporary IP address to the terminal, to be able to communicate data packets with the terminal. A PDP context also means that a physical channel is allocated in the access network, generally referred to as a RAB (Radio Access Bearer), for IP communication. Thus, SIP messages can only be sent over a PDP context.

Figure 3:
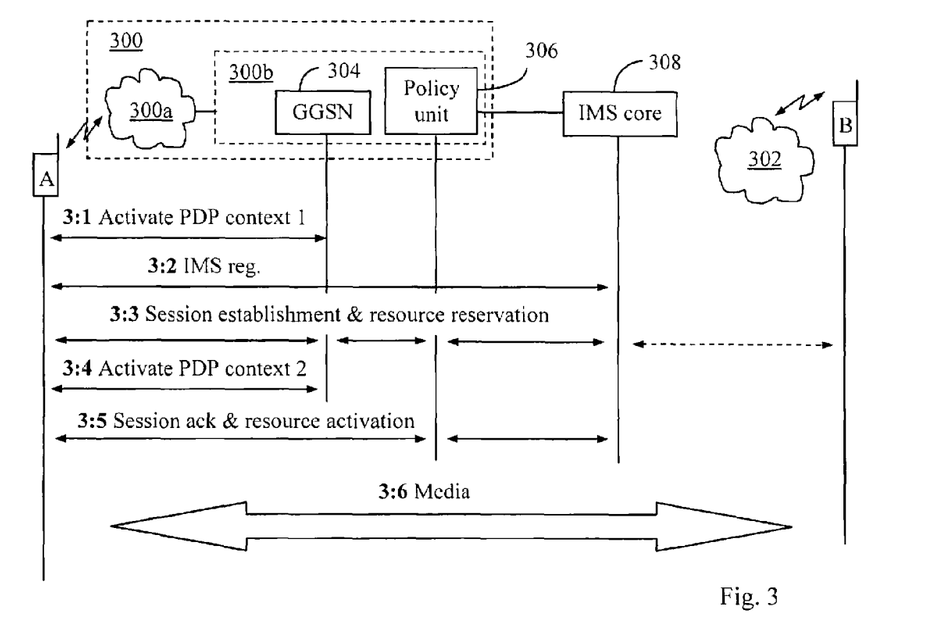
FIG. 3 is a signalling diagram illustrating different stages in the process of establishing a multimedia session according to the prior art.

FIG. 3 illustrates the gradual activation of a mobile terminal A about to communicate multimedia with another party B, involving basically five stages 3:1-3:5 as illustrated, each comprising various messages back and forth. These messages are well-known in the art and will not be described in any detail. Terminal A is located under radio coverage of a mobile access network 300, which is divided into a radio network part 300a and a core network part 300b.

The core network 300b shown in FIG. 3 includes a GGSN (Gateway GPRS Switching Node) 304 and a "policy unit" 306, often referred to as PDF (Policy Decision Function) or PCRF (Policy and Charging Rule Function). The policy unit is basically responsible for authorising communication sessions. Of course, network 300 contains numerous other nodes and elements that are not necessary to describe to understand the context of the present invention. For simplicity, the IMS network of terminal A is here merely represented as an "IMS core" 308, containing various nodes, not shown, involved in the procedures to be described below.

In a first stage 3:1, a basic PDP context, referred to as "primary", is activated to obtain an IP connection. Activating the primary PDP context includes obtaining a RAB, for packet-switched SIP signalling messages over IP. The PDP context is created by GGSN 304. This RAB is typically based on so-called "best effort" communication with no particular requirements regarding bit rate and delay, since it is only intended to occasionally carry limited SIP messages.

In a next stage 3:2, terminal A registers with the IMS core 308, as basically handled by an S-CSCF node and HSS therein, not shown. The IMS registration involves a certain amount of SIP-based signalling over the primary PDP context.

Next, a multimedia session is to be established with party B in a following stage 3:3. In this stage, the above-mentioned protocol SDP is used within the SIP messages, such as INVITE, to communicate session-specific parameters including codec's, wherein some parameters may be indicated as preconditions.

Typically, a calling terminal proposes one or more codec's, along with other parameters, to use during the session, as specified in an INVITE message, and the called terminal responds by confirming a suitable proposed codec, and any other proposed parameters, in an "OK (invite)" message. Stage 3:3 further includes authorising the session in the policy unit 306, based on the session data and stored subscriber data. Stage 3:3 also includes a procedure for reserving communication resources in the mobile network 300 that are adapted to the forthcoming session with party B and according to parameters confirmed by both parties in their SIP dialogue.

The session establishment and resource reservation entail that a secondary PDP context is activated for terminal A, here indicated as a separate stage 3:4, which should be adapted for the media type(s) involved in the forthcoming session. The following QoS parameters may be indicated in the secondary PDP context: Traffic class, Maximum bit rate (uplink/downlink), Guaranteed bit rate (uplink/downlink), Transfer delay (uplink/downlink), Delivery order, Maximum SDU (Service Data Unit) size and a Source Statistic Descriptor.

The secondary PDP context is handled by GGSN in the same manner as for the primary PDP context in stage 3:1. Thus, the secondary PDP context should be defined so as to fulfil the requirements of the session with respect to the QoS parameter information as well as other factors, in order to obtain a proper RAB for media to be communicated. The new RAB is thus more stable and reliable as compared to the first one associated with the primary PDP context, and should provide a "guaranteed" QoS.

When the secondary PDP context has finally been established, the session must be acknowledged and the reserved resources be activated, as illustrated in a stage 3:5, before commencing the actual session in a final illustrated stage 3:6, over the secondary PDP context. Activating network resources is sometimes referred to as "opening of gates".

The process of establishing a session, reserving network resources, activating the secondary PDP context and activating the reserved resources, as illustrated in stages 3:3-3:5, requires a significant amount of sequential signalling as dictated by standardised protocols. Moreover, a similar procedure must take place for the other party, at least if the other party is also a mobile terminal. In particular, stage 3:3 cannot be executed simultaneously at both sides, since the B-side in this case will reserve network resources before confirming session parameters to the B-side, according to prevailing standards. Thus, reserving network resources at the A-side must wait until confirmed session parameters have been received from the B-side.

The communication of media is thus delayed by the extensive sequential signalling required according to conventional set-up procedures for multimedia sessions. In the field of mobile communication, it is generally desirable to minimise such delays to make multimedia services more attractive to mobile end-users. For example, when using the service called "Push-to-talk over Cellular (PoC)", which emulates a walkie-talkie service, users wish to talk immediately after pressing a push-to-talk button or similar, although this basically triggers the entire process of stages 3:3-3:5 above.

Further, the reservation of network resources is initiated by the mobile terminal and is therefore partly out of control for a network operator. It is thus generally desirable for network operators to gain full control of the allocation of network resources to different users.

SUMMARY OF THE INVENTION

It is an object of the present invention to make it possible to generally avoid or at least reduce the problems outlined above. More specifically, it is an object of the present invention to make it possible to reduce the delay before a mobile terminal can start communicate media, and to enable a network operator to gain control over network resources.

These objects and others are obtained by providing a method and an arrangement according to the independent claims attached below.

According to one aspect of the invention, a method of establishing a packet-switched multimedia session for a mobile terminal in communication with another party is provided, wherein a primary PDP (Packet Data Protocol) context has been activated in a mobile network for the mobile terminal. The inventive method can be executed in the mobile network. Information on the forthcoming session is received, which has been negotiated and agreed between the communicating parties. It is then determined whether any network resources providing a required QoS are needed for the session in the mobile network. It is also determined whether a secondary PDP context is to be activated for the mobile terminal and the forthcoming session. If network resources are needed and a secondary PDP context is to be activated, the activation of said secondary PDP context is triggered.

The session information may be included in a response from a called party to a session invitation from a calling party, said response effectively confirming session parameters proposed in the session invitation. The session information may be derived from an SDP (Session Description Protocol) given in said response.

The presence of a media flag in the received SDP and the session description in the SDP itself, may be used for determining whether any network resources providing a required QoS are needed for the session, such that an indication "active" in the SDP implies that network resources have been reserved and are therefore not needed, whereas said media flag indicating "inactive" in the SDP implies that network resources have not been reserved and are therefore needed. Preconditions given as attributes in SDP may also be used for determining whether any network resources providing a required QoS are needed, such that network resources are needed when the given preconditions are currently not met, and vice versa.

Subscription and authentication data for said mobile terminal and its user, and also the type of application or service that has been invoked for the forthcoming session, may be used for determining whether a secondary PDP context is to be activated for the forthcoming session.

The above-mentioned determining and triggering steps are preferably executed by a policy unit basically responsible for authorising communication sessions in the mobile network. The policy unit may be a PDF (Policy Decision Function) or a PCRF (Policy and Charging Rule Function).

The activation of secondary PDP context may be triggered by sending a request for activating a secondary PDP context for the terminal, to a GGSN in the mobile network. The request for activating a secondary PDP context may be included in a modified existing message "Credit Control Request CCR" that may be sent to the GGSN over a DIAMETER based protocol Gx. In response to receiving said request for activating a secondary PDP context, the GGSN may install rules for the forthcoming session and may send an order to the mobile terminal to initiate a secondary PDP context.

According to another aspect of the invention, an arrangement in a mobile network for establishing a packet-switched multimedia session for a mobile terminal in communication with another party is provided, wherein a primary PDP (Packet Data Protocol) context has been activated in the mobile network for the mobile terminal. The arrangement comprises means for receiving information on the forthcoming session which has been negotiated and agreed between the communicating parties, means for determining whether any network resources providing a guaranteed QoS are needed for the session, means for determining whether a secondary PDP context is to be activated for the mobile terminal and the forthcoming session, and means for triggering the activation of said secondary PDP context if network resources providing a required QoS are needed and a secondary PDP context is to be activated.

The arrangement may further comprise means for extracting said session information from a response from a called party to a session invitation from a calling party, said response effectively confirming session parameters proposed in the session invitation. The arrangement may further comprise means for deriving the session information from an SDP (Session Description Protocol) given in said response.

The arrangement may further comprise means for using the presence of a media flag in the received SDP and the session description in the SDP itself, for determining whether any network resources providing a required QoS are needed for the session, such that an indication "active" in the SDP implies that network resources have been reserved and are therefore not needed, whereas said media flag indicating "inactive" in the SDP implies that network resources have not been reserved and are therefore needed.

The arrangement may further comprise means for using preconditions given as attributes in SDP for determining whether any network resources providing a required QoS are needed, such that network resources are needed when the given preconditions are currently not met, and vice versa.

The arrangement may further comprise means for using subscription and authentication data for said mobile terminal and its user, and also the type of application or service that has been invoked for the forthcoming session, for determining whether a secondary PDP context is to be activated for the forthcoming session.

The determining means and triggering means may be included in a policy unit basically responsible for authorising communication sessions in the mobile network. The policy unit may be a PDF (Policy Decision Function) or a PCRF (Policy and Charging Rule Function).

The arrangement may further comprise means for triggering the activation of secondary PDP context by sending a request for activating a secondary PDP context for the terminal, to a GGSN in the mobile network. The arrangement may further comprise means for including said request for activating a secondary PDP context in a modified existing message "Credit Control Request CCR" that is sent to the GGSN over a DIAMETER based protocol Gx.

The arrangement may further comprise means in a GGSN for installing rules for the forthcoming session and for sending an order to the mobile terminal to initiate a secondary PDP context, in response to receiving said request for activating a secondary PDP context.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

In the present invention, the task of triggering the activation of a secondary PDP context for a mobile terminal is shifted from the terminal to its mobile core network, or rather "home" mobile core network if the terminal is roaming elsewhere. Thereby, the network operator can gain full control over its network resources, the delay before session start can be reduced, and signalling conflicts can be avoided.

Figure 4:
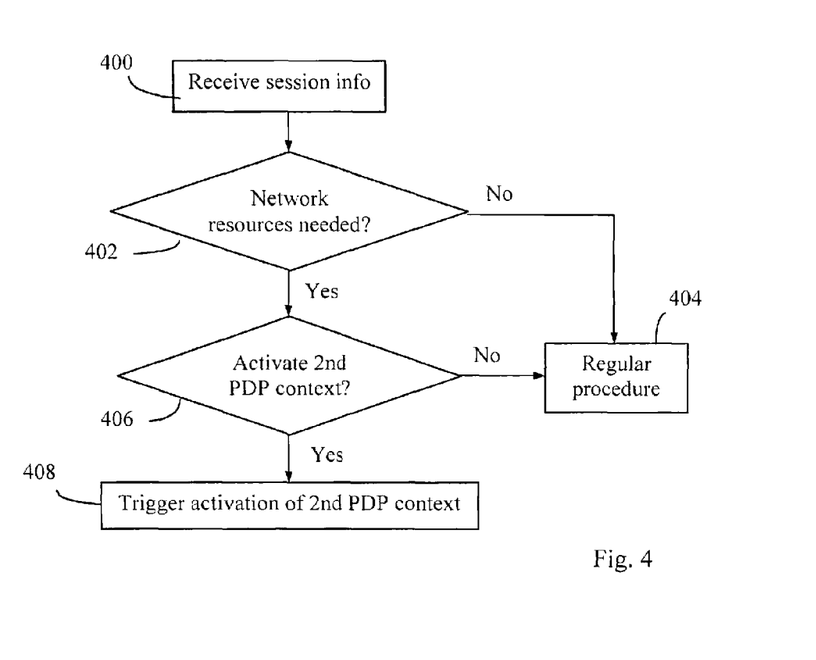
FIG. 4 is a flow chart illustrating a procedure for establishing a multimedia session, according to one aspect of the present invention.

A schematic procedure for establishing a multimedia session for two communicating parties including a mobile terminal, according to one aspect of the present invention, will now be described with reference to a flow chart shown in FIG. 4. It is assumed that a communication session involving the mobile terminal has been requested, either by said mobile terminal or by an opposite party. In a first step 400, information on the forthcoming session is received which has been negotiated and agreed between the communicating parties. The session information may be derived from the SDP given in a response from a called party to a session invitation, the response effectively confirming proposed session parameters, such as the response message called OK (invite) mentioned above.

In a next step 402, it is determined whether any network resources providing a required QoS are needed for the session. According to different embodiments, this can be determined by checking the presence of a "media flag" called "inactive", which is a currently existing attribute in SDP used for indicating if media resources are inactive. On the other hand, if the "inactive" media flag is not present, the media resources are active. In one embodiment of the present invention, it is proposed to use the media flag such that if the media flag is not present (active), it implies that network resources have been reserved, and therefore no resource reservation, by means of activating a secondary PDP context, is needed. However, when the media flag is present (inactive), no network resources have been reserved, which is therefore needed.

Alternatively, attributes marked as preconditions in the SDP may be used for determining whether network resources providing a required QoS are needed or not, such that such network resources are needed when the given preconditions are currently not met, and vice versa.

It should be noted that any mechanism for indicating the need for resource reservation may be used, and the present invention is not limited to the examples described above.

If it is determined in step 402 that network resources providing a required QoS are actually not needed, it is not necessary to activate a secondary PDP context, accordingly, and a regular procedure may be used for completing the session setup, as indicated by a step 404.

However, if it was determined in step 402 that network resources providing a required QoS are needed, it is further determined, in a following step 406, whether a secondary PDP context is to be activated for the forthcoming session or not. The decision for activating a secondary PDP context is further based on various subscription and authentication data, and also the type of application or service that has been invoked for the forthcoming session. For example, certain applications may require a QoS demanding a secondary PDP context, whereas others do not. A mobile user's subscription may allow for a certain QoS and/or certain preferences for certain services, or may deny access to other services, and so forth.

If it was determined in step 406 that no secondary PDP context is to be activated, the regular procedure indicated by step 404 may be used for completing the session setup. If a secondary PDP context is indeed to be activated, i.e. if the session can be authorised, the process proceeds to a final illustrated step 408, for triggering the activation of secondary PDP context for the mobile terminal and the forthcoming session. When the present inventive procedure is executed in accordance with steps 400,402,406 and 408 above, the network operator will gain full control over resource allocation generally associated with secondary PDP context activation. The setup delay can also be reduced, since the process generally requires less signalling and can take place simultaneously and independently for the opposite terminal, which will become apparent from the description of FIG. 5 below.

As will be understood from the embodiment to be described below, the procedure for establishing a multimedia session according to the flow chart shown in FIG. 4 can basically be implemented in a policy unit or similar belonging to a mobile access network, e.g. as the unit 306 shown in FIG. 3. The policy unit may be a PDF (Policy Decision Function) or a PCRF (Policy and Charging Rule Function), and is basically responsible for authorising communication sessions. Further, GGSN 304 and the IMS core 308 of FIG. 3 may require some adaptations to the new behaviour of the policy unit 306.

Figure 5:
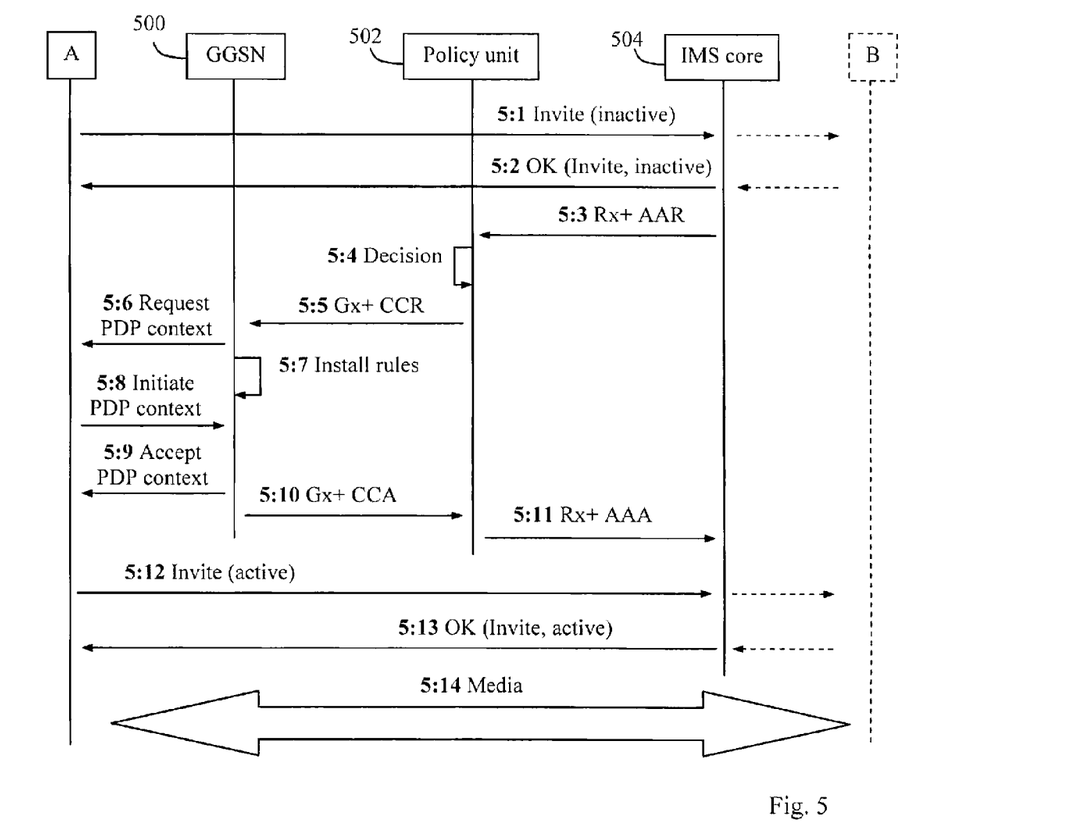
FIG. 5 is a signalling diagram illustrating different messaging steps for establishing a multimedia session, according to a preferred embodiment.

FIG. 5 is a signalling diagram illustrating different steps for establishing a multimedia session between a mobile terminal A and another party B, according to a preferred embodiment. This embodiment shows how certain existing standard messages for session setup can be utilised to convey information needed for the activation of a secondary PDP context, if needed. Similar to FIG. 3, the network elements involved include a GGSN 500 and a policy unit 502 belonging to a home mobile network of terminal A, and an IMS core 504 associated with the same mobile network. The opposite network side, not shown, is basically alike if party B is also a mobile terminal.

It is assumed that a primary PDP context has been activated for terminal A for signalling messages, as described for step 3:1 above. The process starts by a step 5:1 when terminal A sends an INVITE message towards party B, in order to execute a multimedia session generally involving the communication of media in either or both directions. The INVITE message contains an SDP with proposed session parameters, and is conveyed over the IMS core 504 to the B side, as indicated by a dashed arrow. Since no media is communicated at this point, it is assumed that terminal A has set the media flag as "inactive" in the SDP of the INVITE message.

After having considered the proposed session parameters indicated in the received INVITE message, B sends a response OK (invite) message back towards terminal A, in a next step 5:2. As described above, party B includes a corresponding SDP in the OK (invite) message containing confirmed session parameters, which can be used in the forthcoming session by both parties A,B. Further, it is expected that party B maintains the media flag as inactive in the SDP in this message.

When IMS core 504 detects the OK response message from B in step 5:2, the SDP information is translated into a DIAMETER based protocol Rx, to which subscription specifics of terminal A are added as a basis for a regular Authorisation/Authentication routine. All this information is then issued to the policy unit 502 in an existing message called "Authorisation/Authentication Request AAR" for terminal A, in a next step 5:3. So far, the process has been executed according to regular procedures for initiating and authorising the session.

In a next step 5:4, the policy unit 506 takes a decision as to whether a secondary PDP context is to be activated for terminal A and the forthcoming session. The decision is taken basically as described above for steps 402 and 406 of FIG. 4, and is therefore not necessary to repeat here in any detail. It should be noted, though, that the existing AAR message is utilised in this embodiment for carrying the media flag to provide a basis for the decision, together with an application identity given in the SDP and said subscription specifics. Alternatively, preconditions may be provided in the SDP as a similar basis for the decision, as described above.

In this example, it is assumed that the policy unit 502 decides in step 5:4 to activate a secondary PDP context, e.g. after reading an inactive media flag, or detecting that given preconditions are not met. In a next step 5:5, a request to initiate a secondary PDP context for the terminal A is therefore sent from the policy unit 502 to GGSN 500. This request may be conveyed, e.g., by using a standard credit control message. In this example, an existing message "Credit Control Request CCR" is modified to include said request, and is sent over a DIAMETER based protocol Gx to GGSN 500. This message, which in regular prior art procedures is normally sent the other way round from GGSN to the policy unit during PDP context activation, can thus be utilised for conveying the request to initiate a secondary PDP context for the terminal A, including QoS requirements among other things. This message effectively triggers the secondary PDP context activation, as executed by GGSN 500 which now can allocate network resources, including a RAB, to terminal A. Thereby, the trigger is controlled by the policy unit, i.e. effectively the network operator, instead of by the terminal.

Next, The GGSN node initiates the secondary PDP context e.g. by sending a request for the terminal to invoke the normal procedure for activation of a secondary PDP context with the parameters defined in the initiation request. However, the present invention is not limited in this respect, and any mechanism may be used for activating the secondary PDP context, whether or not involving the terminal. In this example, however, the GGSN 500 sends a message "Request PDP context" to terminal A, in a step 5:6. This message effectively orders terminal A to "initiate" the secondary PDP context in a regular way. At this point, GGSN 500 also installs "rules", as indicated by a step 5:7, that will be used during the session for controlling the transfer of media. Installing rules includes storing session-specific QoS parameters and charging parameters, as well as the IP address and a port number of terminal A to be used, etc. In response to the message received in step 5:6, terminal A accordingly sends a message "Initiate PDP context" to GGSN 500, in a step 5:8, which is acknowledged by means of a message "Accept PDP context" sent back from GGSN in a step 5:9.

It should be noted that step 5:7 could be executed at any time after step 5:5, but before the next step 5:10 at which GGSN 500 sends a modified standard message Gx CCA, "Credit Control Answer", to the policy unit 502, as a response to the Gx CCR message of step 5:5. The message Gx CCA, normally sent the other way round from the policy unit to GGSN according to the prior art, has now been modified to contain information on the activated secondary PDP context. Thereby, the existing Gx CCA message is utilised for conveying this information to the policy unit in step 5:10, but can still be used for regular credit control also, together with the Gx CCR message of step 5:5, as originally intended.

Then, the policy unit 502 can proceed with sending a standard response to the Rx AAR message, received in step 5:3, called Rx AAA "Authorisation/Authentication Answer", in a step 5:11. This message indicates that the session has now been authorised and network resources have been reserved, thereby allowing the session to commence. After receiving the message "Accept PDP context" in step 5:9, terminal A now sends a new INVITE message to party B, in a step 5:12, this time lacking the "inactive" media flag in the SDP thus indicating "active", and the opposite party responds with an OK (INVITE) message with an SDP indicating "active" accordingly, in a following step 5:13. The last two steps acknowledge the session as active, and the communication of media can take place in a final step 5:14.

By implementing the present invention, e.g. according to embodiments described above, the network operator will have full control over its network resources when establishing a multimedia session for a mobile terminal, since the operator, instead of the terminal, can decide when to trigger a secondary PDP context. The delay before session start can also be reduced.

Present procedures according to the prior art may further result in signalling conflicts, referred to as a "race condition", when setting the media flag in the SDP to inactive, since a responding user (e.g. user B) sets the SDP to active (i.e. lacking "inactive" media flag) when accepting the session description. The responding user can send the Session accept message (SIP OK Invite) and the resource reservation message almost simultaneously. This will allow the responding user to initiate a secondary PDP context before the resources are reserved in the policy unit in the mobile network, resulting in a failure in the PDP establishment, unless the resources reservation signal triggered by the session accept answer has reached the policy unit first, thence race condition. Using the present invention will avoid such a conflict.

While the invention has been described with reference to specific exemplary embodiments, the description is in general only intended to illustrate the inventive concept and should not be taken as limiting the scope of the invention. For example, the SIP signalling protocol and IMS concept have been used throughout when describing the above embodiments, although any other standards and service networks for enabling multimedia communication may basically be used. The present invention is defined by the appended claims.

The invention claimed is:

1. A method of establishing a packet-switched multimedia session for a mobile terminal in communication with another party, wherein a primary PDP (Packet Data Protocol) context has been activated in a mobile network for the mobile terminal, the method comprising the following steps, as executed in the mobile network:
   receiving information on the forthcoming session, which has been negotiated and agreed between the communicating parties,
   determining whether any network resources providing a required QoS are needed for the session in the mobile network,
   determining whether a secondary PDP context is to be activated for the mobile terminal and the forthcoming session,
and if network resources are needed and a secondary PDP context is to be activated,
   triggering the activation of said secondary PDP context.

2. A method according to claim 1, wherein said session information is included in a response from a called party to a session invitation from a calling party, said response effectively confirming session parameters proposed in the session invitation.

3. A method according to claim 2, wherein the session information is derived from an SDP (Session Description Protocol) given in said response.

4. A method according to claim 3, wherein the presence of a media flag in the received SDP and the session description in the SDP itself, are used for determining whether any network resources providing a required QoS are needed for the session, such that an indication "active" in the SDP implies that network resources have been reserved and are therefore not needed, whereas said media flag indicating "inactive" in the SDP implies that network resources have not been reserved and are therefore needed.

5. A method according to claim 3, wherein preconditions given as attributes in SDP are used for determining whether any network resources providing a required QoS are needed, such that network resources are needed when the given preconditions are currently not met, and vice versa.

6. A method according to claim 1, wherein subscription and authentication data for said mobile terminal and its user, and also the type of application or service that has been invoked for the forthcoming session, are used for determining whether a secondary PDP context is to be activated for the forthcoming session.

7. A method according to claim 1, wherein said determining steps and triggering step are executed by a policy unit basically responsible for authorizing communication sessions in the mobile network.

8. A method according to claim 7, wherein the policy unit is a PDF (Policy Decision Function) or a PCRF (Policy and Charging Rule Function).

9. A method according to claim 8, wherein the activation of secondary PDP context is triggered by sending a request for activating a secondary PDP context for the terminal, to a GGSN in the mobile network.

10. A method according to claim 9, wherein said request for activating a secondary PDP context is included in a modified existing message "Credit Control Request CCR" that is sent to the GGSN over a DIAMETER based protocol Gx.

11. A method according to claim 9, wherein, in response to receiving said request for activating a secondary PDP context, the GGSN installs rules for the forthcoming session and sends an order to the mobile terminal to initiate a secondary PDP context.

12. An arrangement in a mobile network for establishing a packet-switched multimedia session for a mobile terminal in communication with another party, wherein a primary PDP (Packet Data Protocol) context has been activated in the mobile network for the mobile terminal, comprising:
  means for receiving information on the forthcoming session which has been negotiated and agreed between the communicating parties,
  means for determining whether any network resources providing a guaranteed QoS are needed for the session,
  means for determining whether a secondary PDP context is to be activated for the mobile terminal and the forthcoming session, and
  means for triggering the activation of said secondary PDP context, if network resources providing a required QoS are needed and a secondary PDP context is to be activated.

13. An arrangement according to claim 12, further comprising means for extracting said session information from a response from a called party to a session invitation from a calling party, said response effectively confirming session parameters proposed in the session invitation.

14. An arrangement according to claim 13, further comprising means for deriving the session information from an SDP (Session Description Protocol) given in said response.

15. An arrangement according to claim 14, further comprising means for using the presence of a media flag in the received SDP and the session description in the SDP itself, for determining whether any network resources providing a required QoS are needed for the session, such that an indication "active" in the SDP implies that network resources have been reserved and are therefore not needed, whereas said media flag indicating "inactive" in the SDP implies that network resources have not been reserved and are therefore needed.

16. An arrangement according to claim 14, further comprising means for using preconditions given as attributes in SDP for determining whether any network resources providing a required QoS are needed, such that network resources are needed when the given preconditions are currently not met, and vice versa.

17. An arrangement according to claim 12, further comprising means for using subscription and authentication data for said mobile terminal and its user, and also the type of application or service that has been invoked for the forthcoming session, for determining whether a secondary PDP context is to be activated for the forthcoming session.

18. An arrangement according to claim 12, wherein said determining means and triggering means are included in a policy unit basically responsible for authorizing communication sessions in the mobile network.

19. An arrangement according to claim 18, wherein the policy unit is a PDF (Policy Decision Function) or a PCRF (Policy and Charging Rule Function).

20. An arrangement according to claim 19, further comprising means for triggering the activation of secondary PDP context by sending a request for activating a secondary PDP context for the terminal, to a GGSN in the mobile network.

21. An arrangement according to claim 20, further comprising means for including said request for activating a secondary PDP context in a modified existing message "Credit Control Request CCR" that is sent to the GGSN over a DIAMETER based protocol Gx.

22. An arrangement according to claim 20, further comprising means in a GGSN for installing rules for the forthcoming session and for sending an order to the mobile terminal to initiate a secondary PDP context, in response to receiving said request for activating a secondary PDP context.

* * * * *

UNITED STATES PATENT AND TRADEMARK OFFICE
CERTIFICATE OF CORRECTION

PATENT NO. : 7,907,541 B2  
APPLICATION NO. : 12/064210  
DATED : March 15, 2011  
INVENTOR(S) : Lidström et al.

Page 1 of 1

It is certified that error appears in the above-identified patent and that said Letters Patent is hereby corrected as shown below:

On the Cover Page, item (12), under "United States Patent", in Column 1, Line 1, delete "Lindström," and insert -- Lidström, --, therefor.

On the cover Page, item (75), under "Inventors", in Column 1, Line 1, delete "Lindström," and insert -- Lidström, --, therefor.

In Column 2, Line 18, delete "IF" and insert -- IP --, therefor.

Signed and Sealed this  
Nineteenth Day of July, 2011

David J. Kappos  
*Director of the United States Patent and Trademark Office*